(12) United States Patent
Le Brusq et al.

(10) Patent No.: US 8,694,233 B2
(45) Date of Patent: Apr. 8, 2014

(54) METHOD FOR MANAGING FUEL CONSUMPTION OF A HYBRID VEHICLE AND VEHICLE ADAPTED TO SUCH A METHOD

(75) Inventors: Philippe Le Brusq, Lyons (FR); Richard Valayer, Genas (FR)

(73) Assignee: Renault Trucks, St. Priest (FR)

( * ) Notice: Subject to any disclaimer, the term of this patent is extended or adjusted under 35 U.S.C. 154(b) by 172 days.

(21) Appl. No.: 12/809,618

(22) PCT Filed: Dec. 26, 2007

(86) PCT No.: PCT/IB2007/004455
§ 371 (c)(1),
(2), (4) Date: Jun. 21, 2010

(87) PCT Pub. No.: WO2009/081234
PCT Pub. Date: Jul. 2, 2009

(65) Prior Publication Data
US 2010/0274426 A1    Oct. 28, 2010

(51) Int. Cl.
*B60L 3/00* (2006.01)
*B60R 16/023* (2006.01)

(52) U.S. Cl.
CPC .................. *B60R 16/0236* (2013.01)
USPC .............. 701/123; 701/22; 701/30.8

(58) Field of Classification Search
CPC ................................... B60R 16/0236
USPC ..................... 701/22, 30, 30.8, 123
See application file for complete search history.

(56) References Cited

U.S. PATENT DOCUMENTS 4,647,902 A * 3/1987 Teshima et al. ............... 340/439

| | | | |
|---|---|---|---|
| 6,314,347 B1 | 11/2001 | Kuroda et al. | |
| 7,240,750 B2 | 7/2007 | Patel | |
| 2007/0027593 A1* | 2/2007 | Shah et al. | 701/30 |
| 2007/0135988 A1* | 6/2007 | Kidston et al. | 701/22 |
| 2009/0040033 A1* | 2/2009 | Uchida | 702/34 |
| 2009/0115371 A1* | 5/2009 | Chawla et al. | 701/19 |

FOREIGN PATENT DOCUMENTS

| | | |
|---|---|---|
| DE | 102004035306 A1 | 2/2007 |
| EP | 0076764 A | 4/1983 |
| EP | 1256476 A | 11/2002 |
| JP | S58069229 | 5/1983 |

(Continued)

OTHER PUBLICATIONS

International Search Report for corresponding International Application PCT/IB2007/004455.

(Continued)

*Primary Examiner* — Ryan Zeender
*Assistant Examiner* — Hunter Wilder
(74) *Attorney, Agent, or Firm* — WRB-IP LLP

(57) ABSTRACT

This method is for managing fuel consumption of a hybrid vehicle on a given trip, the vehicle including an internal combustion engine, an electric energy storage arrangement and at least an electric machine adapted to work as a generator or as a motor. This method includes:

a) determination, for the given trip, of a target value of a parameter representative of fuel economy resulting from the use of the electric machine, b) determination of an actual value of the parameter when the vehicle is running on the trip, c) comparison of said target value and the actual value, and d) information of a user of the result of the comparison, at least at the end of the trip.

The vehicle is provided with a computation arrangement and display for allowing steps c) and d) to take place onboard.

15 Claims, 3 Drawing Sheets

(56) References Cited

FOREIGN PATENT DOCUMENTS

| | | |
|---|---|---|
| JP | 2003286872 A | 10/2003 |
| JP | 2006057464 A | 3/2006 |
| JP | 2006223068 A | 8/2006 |
| WO | 03086786 A | 10/2003 |
| WO | 2005007444 A | 1/2005 |
| WO | WO 2007114410 A1 * | 10/2007 |

OTHER PUBLICATIONS

JP11220807 (Abstract) Aug. 10, 1999.
Japanese Official Action (Jun. 7, 2013) from corresponding Japanese Application 2010-540177.

* cited by examiner

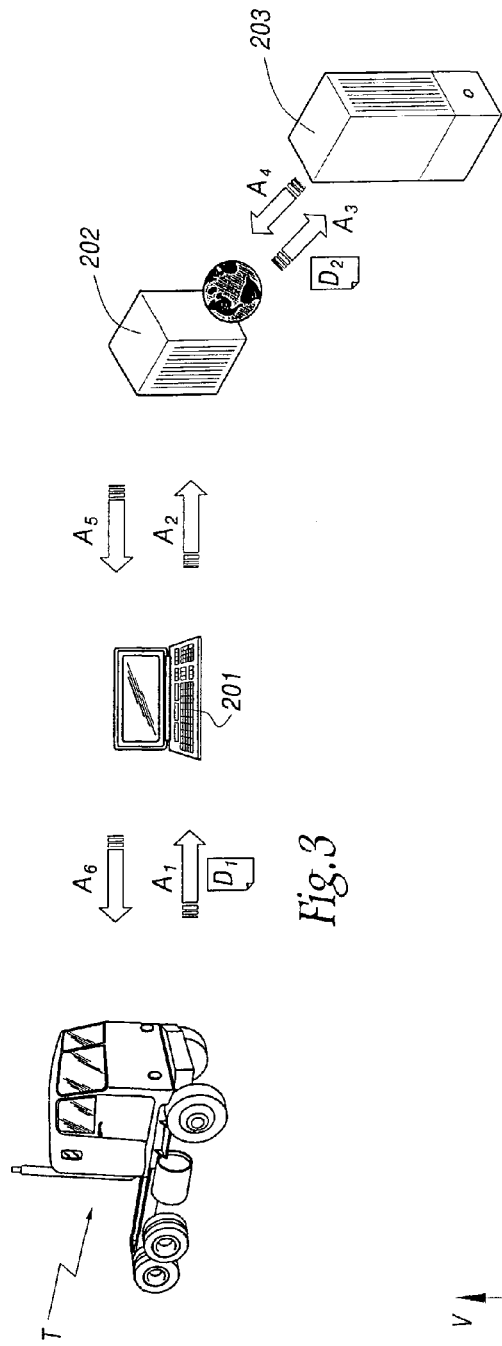
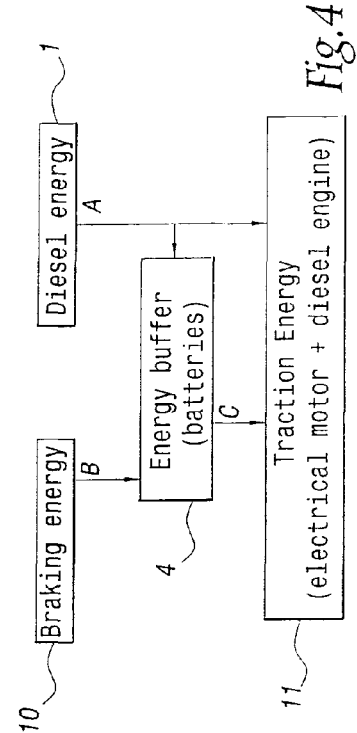
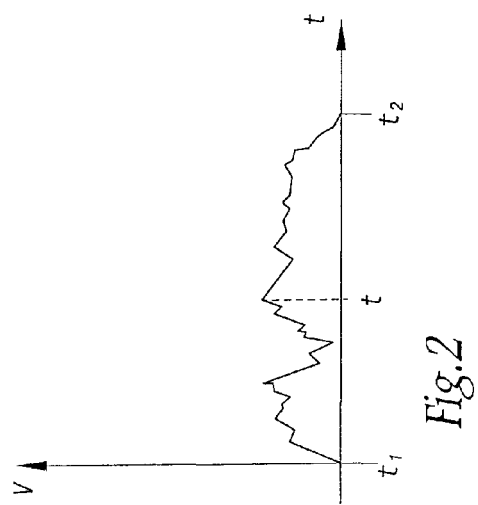
Fig.3
Fig.4
Fig.2

METHOD FOR MANAGING FUEL CONSUMPTION OF A HYBRID VEHICLE AND VEHICLE ADAPTED TO SUCH A METHOD

BACKGROUND AND SUMMARY

This invention concerns a method for managing fuel consumption of a hybrid vehicle on a given trip, in order to optimize energy savings on such a trip. The invention also concerns a vehicle adapted to perform such a method.

The reduction of fuel consumption of automotive vehicles, in particular trucks, is a major issue for the sustainability of road transport and is a key element for the competitiveness of truck manufacturers.

In order to optimize fuel consumption of an internal combustion engine of a vehicle, it is known, e.g. from U.S. Pat. No. 7,240,750, to take into account future energy needs in a hybrid vehicle in order to pro-actively charge the vehicle battery to an appropriate level. Such an approach does not take into account the behaviour of the driver.

It is also known from JP-A-11 220 807 to compute, on the basis of the running state of a vehicle or the behaviour of a driver, a reference fuel consumption and to display an instantaneous actual fuel consumption and the reference fuel consumption. This comparative display is not connected to the actual trip being traveled through by the vehicle, so that optimization of the energy needs is not fully effective.

This invention, according to an aspect thereof, aims at proposing a new method for managing fuel consumption of a hybrid vehicle on a given trip, this method being such that the energy savings resulting from the use of the hybrid components of the vehicle, which derive in particular from the behaviour of the driver, can be compared to a target or optimized value which can be determined on the basis of the trip to be traveled through and on the features of the vehicle.

With this respect, the invention, according to an aspect thereof, relates to a method for managing fuel consumption of a hybrid vehicle on a given trip, this vehicle comprising an internal combustion engine, electric energy storage means and at least an electric machine adapted to work as a generator or as a motor. This method comprises at least the following steps:
a) determination, for the given trip, of a target value of a parameter representative of fuel economy resulting from the use of the electric machine,
b) determination of an actual value of this parameter when the vehicle is running on the given trip,
c) comparison of the target value and actual value determined here-above, and
d) information of a user of the result of the comparison, at least at the end of the trip.

The actual value of the parameter depends on the driving style or behaviour of the driver. Thanks to an aspect of the invention, the driver or a fleet manager can be kept informed of the influence of the driver's style and/or behaviour onto the efficiency of the energy savings resulting from the use of the hybrid components of the vehicle. In other words, the driver and/or the fleet manager is/are aware of the influence of the driving style on the fuel savings for the given trip.

According to a first embodiment of an aspect of the invention, step a) includes at least the following sub-steps:
a1) performance of at least a trial run on the given trip with the vehicle and recordal of a dataset of the vehicle on this trial run,
a2) computation, on the basis of at least the dataset, of a first energy needs value of the vehicle to travel the given trip when only an internal combustion engine is used,
a3) computation, on the basis of at least the dataset, of a second energy needs value of the vehicle to travel the trip when the internal combustion engine, the storage means and the electric machine are used, and
a4) computation of a target value of the parameter, on the basis of the first and second energy needs values.

In such a case, the dataset recorded in step a1) is advantageously representative of the trip and of the operation of the vehicle on the trip. This dataset can include at least a velocity profile of the vehicle along the trip.

Alternatively, and according to another embodiment of an aspect of the invention, step a) includes at least the following steps:
a'1) generation of a model of the trip and the vehicle,
a'2) computation, on the basis of the model, of a first energy needs value of the vehicle to travel the given trip when only an internal combustion engine is used,
a'3) computation, on the basis of the model, of a second energy needs value of the vehicle to travel the trip when the internal combustion engine, the storage means and the electric machine are used, and
a'4) computation of a target value of the parameter, on the basis of the first and second energy needs values.

According to further aspects of an aspect of the invention which are advantageous but not compulsory, this method can incorporate one or several of the following features:
steps a2) to a4) or a'2) to a'4) take place in an off-board computer;
the target value is stored onboard the vehicle after it has been determined;
step b) is performed onboard of the vehicle, on the basis of the actual working conditions of the internal combustion engine, the storage means and the electric machine, when the vehicle is running on the given trip;
step c) is performed onboard of the vehicle and, in step d), the driver is informed onboard of the result of the comparison;
step d) can take place at the end of the trip or occur several times or continuously when the vehicle is running on the given trip,
alternatively or in addition, in step d), information is sent to a remote computer (202) with respect to the result of the comparison of step c).
the parameter which represents fuel economy is a ratio of the energy needs of the vehicle for the given trip which corresponds to the energy savings resulting from the use of the storage means and the electric machine.

The invention, according to an aspect thereof, also concerns a hybrid automotive vehicle which is adapted to perform the method mentioned here-above. This vehicle comprises an internal combustion engine, electric energy storage means, at least an electric machine adapted to work as a generator or as a motor, a memory adapted to store the target value, computation means adapted to determine the actual value of the parameter and to make the comparison of step c) and display means adapted to allow information of the driver according to step d).

The display means are advantageously adapted to display graphically a ratio of the actual value to the target value of the parameter representative of fuel economy.

BRIEF DESCRIPTION OF THE DRAWINGS

The invention will now be explained in correspondence with the annexed figures and as an illustrative example, without restricting the object of the invention. In the annexed figures:

FIG. 2 is a schematic graph showing a velocity profile on a trip, as a function of time, FIG. 3 is a schematic representation of the flow of information with a method of the invention.

FIG. 4 is a diagram showing the energy repartition in a hybrid vehicle in different configurations.

DETAILED DESCRIPTION

Figure 1:
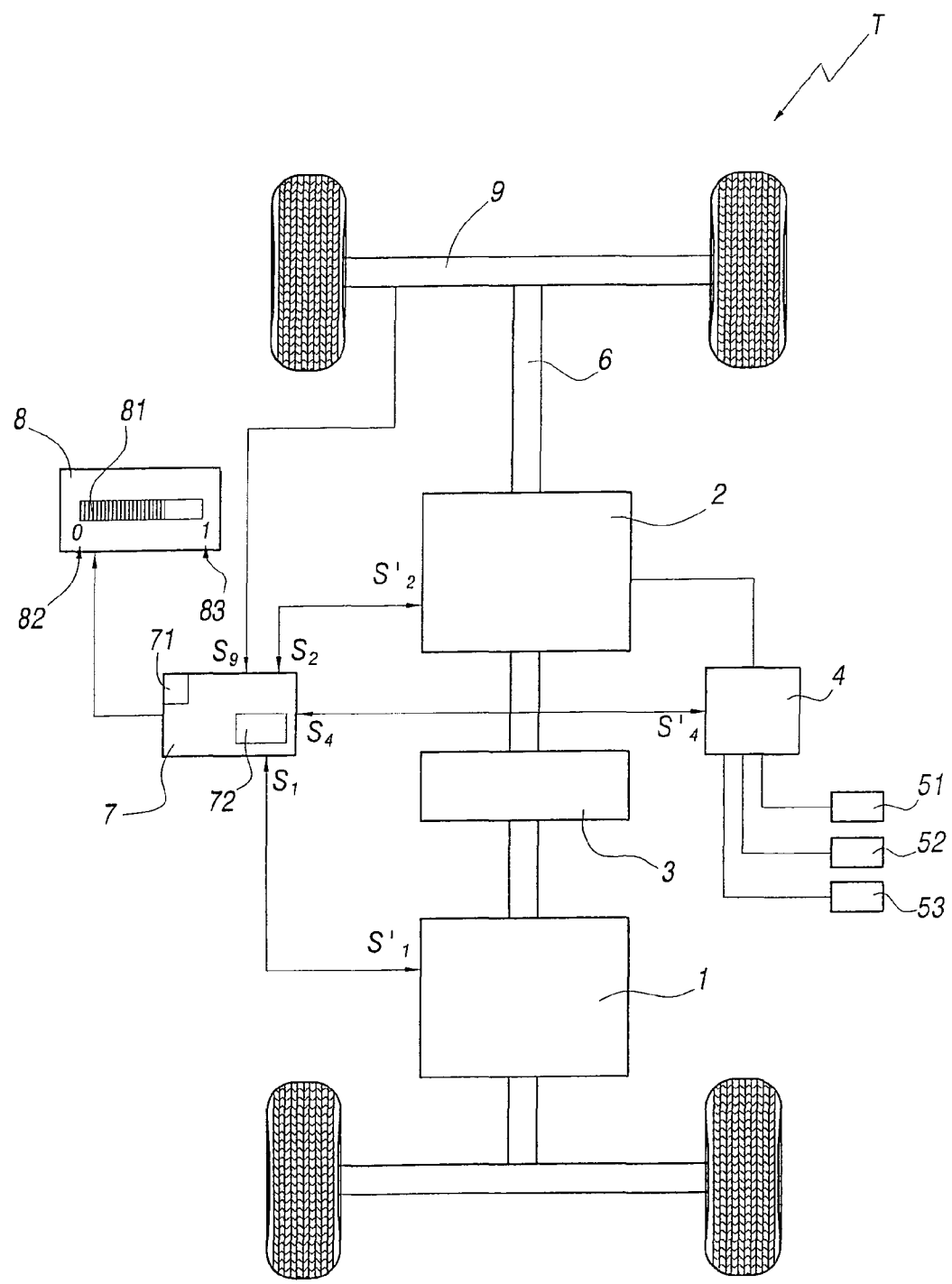
FIG. 1 is a schematic representation of a truck embodying the invention.

The truck T represented on FIG. 1 includes a Diesel internal combustion engine 1, an electric machine 2 and a clutch 3 interposed between the engine and the electric machine. A set of batteries 4 is connected to the electric machine and is adapted to store electric energy generated by machine 2 when this machine works as a generator. Battery set 4 is also adapted to provide electric energy to machine 2 when it works as a motor.

Several other auxiliary equipments 51, 52 and 53, such as in a heating/cooling system for the cabin, electric windows or a radio set, are also fed by battery set 4 with electric energy.

Electric machine 2 is an integrated starter alternator motor or ISAM. It can work as a generator or as a motor since truck T is a hybrid automotive vehicle. More precisely, machine 2 works as a generator when truck T slows down. Under such circumstances, the main shaft 6 of the power transmission gear of truck T drives machine 2 which generates electric power. This power is directed towards battery set 4.

This electric energy, which is stored in battery set 4, can be used later to drive shaft 6 via machine 2 working as a motor, which allows not to use engine 1 or to reduce the use the engine 1 for at least a part of a trip. This saves fuel.

It should be noted here that, according to a non-represented alternative embodiment of the invention, truck T can include several electric machines of the type of machine 2. Although FIG. 1 shows a parallel hybrid configuration, the invention could be applied to all types of hybrid configurations such as a series hybrid configuration or a parallel/series hybrid configuration.

An electronic control unit 7 is connected to engine 1, machine 2 and battery set 4 and is adapted to collect information with respect to these items, in the form of electric signals $S_1$, $S_2$, $S_4$ and to send command signals $S'_1$, $S'_2$, $S'_4$ respectively to these items in order to pilot them.

Control unit 7 is connected to a display 8 which is located in the driver's compartment. Control unit 7 includes a memory 71 and a microchip 72.

When one knows that truck T is going to follow a predetermined route, that is to run on a given trip, one can optimize fuel consumption in engine 1 by making the best use of the hybrid components of the system, in particular items 2 and 4.

According to one embodiment of the method of the invention, one follows the predetermined route with truck T, as a trial run or reference trip on the given trip. During this trip, one records a set of data which will describe the trip. The set of data will for example include the velocity V of truck T as a function of time t. For example, a signal $S_9$ is provided to unit 7 on the basis of the rotational speed of one wheel axle 9 of the truck T. The vehicle speed can also be obtained through a global positioning system (GPS) locator installed on-board the vehicle. This velocity profile can have the shape shown by curve $V_P$ on FIG. 2 where $t_1$ represents the beginning of the trip and $t_2$ represents the end of the trip. During this trip other parameters can also be recorded and stored such as:

the slope of the road along the trip;

the torque provided by the engine and the motor as a function of time;

the battery state of charge as a function of time;

the total vehicle weight, and its possible evolution along the trip;

the instant gearbox ratio, etc.

The reference trip, which will serve as the basis to evaluate further trips, should be preferably preformed by a skilled driver driving the vehicle with maximum care to make the best use of the hybrid components of the system.

Once this reference trip recordal has been performed, a first dataset $D_1$ corresponding to velocity profile $V_P$ and/or, if applicable, to one or several of the other parameters listed above, is transferred to a remote computer as shown by arrow $A_1$ on FIG. 3. This remote computer can be a fleet manager computer 201. This data transfer can occur via any suitable telecommunication means, for instance via a wireless telephone network. The fleet manager can then forward this information to the truck original equipment manufacturer (OEM) server 202. Of course, direct communication of the truck with the OEM server is also possible. The dataset D1, including the velocity profile $V_P$ is then uploaded into this server, as shown by arrow $A_2$. This server 202 includes models for several hybrid vehicles, including truck T. The velocity profile $V_P$ and the features of truck T are forwarded, in a second record data set $D_2$, as shown by arrow A3, from server 202 to an OEM model computer 203 which is able to determine, on the basis of the data received from server 202, fuel consumption of truck T in different configurations during the given trip, between instants $t_1$ and $t_2$.

More precisely, model computer 203 is able to compute fuel consumption of the truck T during the trip if it was equipped with only an internal combustion engine. In an embodiment of the invention, the computation is made with the hypothethis that the truck T is not equipped with its actual engine 1, but with a theoretical engine having the same power and torque ratings as the combination of engine 1 and motor 2. In other words, model computer 203 computes the fuel consumption of truck T on the given trip if one does not make use of the hybrid components of this truck. This gives a first energy needs value $N_1$ for truck T on the given trip.

Model computer C can also compute the energy needs value $N_2$ for truck T when it runs the given trip with an optimized use of the hybrid components 2 and 4, that is when the driver's behaviour is such that maximum fuel savings occur. This second energy needs value $N_2$ is an optimized value, which is smaller than the first value $N_1$.

Computations in computer 203 for determination of values $N_1$ and $N_2$ are made by taking into account the dataset recorded during the trial run. In our example they take into account at least the velocity profile $V_P$. They can also take into account other parameters, such as those listed above.

Considering the energy distribution within truck T, as shown on FIG. 4, one can consider the energy A delivered by Diesel engine 1 or by the theoretical engine. When computing in the configuration where only the theoretical engine is used to power truck T, the value of energy A equals $N_1$.

When truck T is used in hybrid mode, that is when one uses machine 2 to save fuel, at least a part B of the braking energy used to slow down the truck T is transferred to the energy buffer formed by battery set 4. A part C of this energy, preferably the major part of this energy, is provided to the transmission train 11 of truck T as traction energy. The transfer of energy B occurs when electric machine works as a generator, whereas the transfer of energy C occurs when machine 2 works as a motor.

When truck T works in hybrid mode, the value of energy A provided by Diesel engine 1 equals to $N_1$-C.

The value $N_2$ corresponds to an optimized value of A when transfer energy C has been maximized on the given trip.

One can compute, from values $N_1$ and $N_2$, a free energy rate R, which corresponds to the portion of the traction energy which has not been provided by fuel injected in engine 1. This free energy rate is a percentage representing the free energy and can be expressed as:

$$R=C/N_1=(N_1-N_2)/N_1$$

This free energy rate is a parameter which is representative of the fuel savings resulting from the use of electric machine 2.

Model computer 203 runs in order to determine working conditions of truck T along the given trip in a way which will maximize free energy rate R.

This maximized or optimized value of rate R forms a target value $R_T$ which can be sent back to OEM server 202 together with value $N_1$, as shown by arrow $A_4$, and then to computer 201 and truck T, as shown by arrows $A_5$ and $A_6$. The target value $R_T$ and the energy needs value $N_1$ can then be stored in memory 71.

Communication between computers 201 and 203 and server 202 can occur via the Internet or any other adapted networks. Direct communication between computers 202 and 203 is also possible, in particular for what concerns the transfer of value $R_T$. Direct communication between computer 203 and truck T can also be considered for the transfer of value $R_T$.

According to an alternative embodiment of the invention, instead of performing a trial run on the trip as explained here-above, one can generate in model computer 203 a model of the trip, on the basis of a three dimensional map of said trip, and use data relating to truck T and coming from server 202. Computation of values $N_1$ and $N_2$, on the one hand, and of free energy rate R can then be performed in model computer 203 as explained here-above. This enables also to generate a target value $R_T$ for this ratio.

When a driver uses truck T to run the given trip after determination of target value $R_T$, it is possible to collect data relating to the actual working conditions of items 1, 2 and 4. Of course, the truck T needs not necessarily be the same individual truck T as the one used to perform the reference trip mentioned above, but at least a truck having similar characteristics. In particular, it is possible to measure the instantaneous fuel consumption of engine 1 along this given trip. This is included in signal $S_1$. This enables microchip 72 to determine a third value $N_3$ of the energy needs for truck T on the given trip, this value corresponding to the actual needs of engine 1 which depends, in particular, on the behaviour of the driver. The free energy rate R can also be defined in this case as the actual free energy rate, namely:

$$R_A=(N_1-N_3)/N_1$$

At the end of the trip, it is possible to compute the ratio Q of the actual free energy rate $R_A$ on the target free energy rate $R_T$ namely:

$$Q=R_A/R_T$$

This ratio Q can be considered as a sustainable driving indicator insofar as its value depends on the driving behaviour of the driver. The closer to 1 Q is, the better the driving behaviour is in terms of fuel consumption.

Once ratio Q has been computed, it can be displayed on display 8 in order to inform the driver. This can be done by changing the colour of a zone 81 of display 8. Markings 82 and 83 can be made on display 8 in order to facilitate its reading. In the example of FIG. 1, the larger zone 81 is, the higher ratio Q is.

Display 8 can also show ratio Q as an numerical value between 0 and 1.

As an alternative, the value of ratio Q can be sent, by the same means as the ones used to transfer the velocity profile $V_P$, to the fleet manager computer 201. This enables the fleet manager to know the influence of the driver's behaviour on fuel consumption.

Of course, both the driver and the fleet manager can be informed of the value of Q, if one so wishes.

Figure 5:
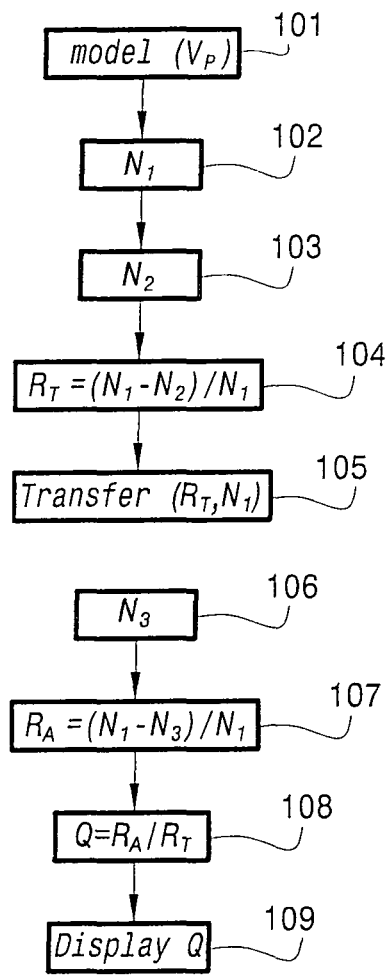
FIG. 5 is a block diagram showing some main steps of a method of the invention.

Turning now to FIG. 5, the method of the invention includes a first step 101 where one creates a model of the given trip to be followed by the truck. As explained here-above, this can be done on the basis of a trial run on the trip, with generation of a dataset, or by creation of computed model.

Then, in a further step 102, one computes the energy needs value $N_1$. In another step 103, one computes energy needs value $N_2$. Steps 102 and 103 can occur one after the other or simultaneously in computer 203.

In a further step 104, one computes the target value $R_T$ of the free energy rate R. This target value is then transferred to the truck T, together with value $N_1$, in a further step 105. Steps 101 to 105 form a preparatory part of the method of the invention, which is done once for the given trip.

Then, each time the truck T runs on the given trip, one can perform steps 106 to 109 to assess the sustainability of the driver's behaviour. In a step 106, one collects data of the actual energy needs $N_3$ for truck T. This value can be, for instance, the number of fuel liters needed to run the given trip or the energy output of engine 1. In a further step 107, one computes the actual free energy rate $R_A$, on the basis of value $N_3$ and of value $N_1$ previously stored in memory 71.

At the end of the trip, one compares in a step 108 this actual rate $R_A$ to the target value R, in particular by determining the ratio Q.

In a further step 109, one informs the driver and/or the fleet manager of the result of this comparison, by displaying information corresponding to ratio Q.

In the method mentioned here-above, comparison step 108 takes place at the end of the trip. However, such a comparison can also take place on several occasions during the trip or even continuously during the trip, insofar as the target value of the free energy rate has been previously computed for different instants during the trip. In fact, a sub-trip can be considered between instant $t_1$ and any instant t between instant $t_1$ and $t_2$ and comparison can be said take place at the end of such a sub-trip.

According to an alternative method of the invention, computation of the actual free rate energy rate $R_A$ and comparison with the target value $R_T$ can take place off board truck T, e.g. in computer 201. In such a case, values $N_1$, $N_3$ and $R_T$ are sent to computer 201 when available, that is at step 104 and at the end of step 106. The fleet manager can then be informed of the influence of the driver's behaviour independently of the driver. In such a case, the result of the comparison of step 108, which takes place on computer 201, is displayed on the screen of this computer at step 109.

According to an another alternative method of the invention, all or part of the computation which has been described as being carried off-board the vehicle can be carried on-board the vehicle.

Thanks to the invention, a so called "econometer" is provided for the driver and/or for the fleet manager which will inform him or them of the actual use of the hybrid capacities of the truck.

The invention also allows to compare the respective driving styles of several drivers on a given trip, for what concerns fuel savings. Once the given trip has been chosen as a reference trip, the drivers can drive one truck on this trip one after the other and their respective Q ratio can be compared.

The invention has been described with respect to its use with a truck. However, it can also be used with a passenger car or a bus and any other hybrid automotive vehicles.

The invention claimed is:

1. A method for managing fuel consumption of a hybrid vehicle on a given trip, the vehicle comprising an internal combustion engine, electric energy storage means and at least an electric machine configured to work as a generator or as a motor, this method comprising:
   determining a target value of a parameter representative of fuel savings resulting from the use of the electric machine, wherein the parameter is a comparison of the energy needs of the vehicle for the trip corresponding to the energy savings resulting from the use of the storage means and the electric machine;
   determining an actual value of the parameter when the vehicle is running on the trip;
   comparing the target value and the actual value; and
   informing a user of a result of the comparison of the target value and the actual value at least at the end of the trip, wherein the result of the comparison of the target value and the actual value is a numerical value representing an influence of a driver's behavior in terms of fuel consumption,
   wherein determining the target value comprises:
      computation of a first energy needs reference value of the vehicle to travel the trip when only the internal combustion engine is used;
      computation of an optimal second energy needs reference value of the vehicle to travel the trip when the internal combustion engine, the storage means and the electric machine are used; and
      computation of the target value of the parameter, on the basis of the first and second energy needs reference values, and
   wherein determining the actual value comprises:
      computation of a third energy value of the vehicle corresponding to an actual need of the internal combustion engine when the driver is driving the vehicle on the trip; and
      computation of the actual value of the parameter, on the basis of the first energy needs reference value and the third energy value.

2. The method according to claim 1, wherein the step of determining the target value includes at least the following sub-steps:
   a1) performance of at least a trial run on the trip with the vehicle and recording of a dataset on the trial run,
   a2) computation, on the basis of at least the dataset, of the first energy needs reference value of vehicle to travel trip when only an internal combustion engine is used,
   a3) computation, on the basis of at least the dataset, of the optimal second energy needs reference value of the vehicle to travel the trip when the internal combustion engine, the storage means and the electric machine are used.

3. The method according to claim 2, wherein the dataset recorded in step a1) is representative of the trip and of the operation of the vehicle on the trip.

4. The method according to claim 2, wherein the dataset recorded in step a1) includes at least a velocity profile of the vehicle along the trip.

5. The method according to claim 1, wherein the step of determining the target value includes at least the following steps:
   a'1) generation of a model of the trip and the vehicle,
   a'2) computation, on the basis of the model, of the first energy needs reference value of the vehicle to travel the trip when only an internal combustion engine is used,
   a'3) computation, on the basis of the model, of the optimal second energy needs reference value of vehicle to travel the trip when the internal combustion engine, the storage means and the electric machine are used.

6. The method according to claim 2, wherein steps a2) to a3) take place in an off board computer.

7. The method according to claim 1, wherein the target value is stored onboard vehicle after it has been determined.

8. The method according to one of the pervious claims, wherein the step of determining the actual value is performed onboard the vehicle on the basis of the actual working conditions of the internal combustion engine, the storage means and the electric machine, when vehicle is running on trip.

9. The method according to claim 1, wherein the step of comparing the target value with the actual value is performed onboard the vehicle and the driver, in the step of informing the user, is informed onboard of the result of the comparison.

10. The method according to claim 9, wherein the step of informing the user takes place at the end of the trip.

11. The method according to claim 9, wherein the step of informing the user occurs several times or continuously when the vehicle is running on the trip.

12. The method according to claim 1, wherein in the step of informing the user, information is sent to a remote computer with respect to the result of the comparison of the target value and the actual value.

13. The method according to claim 5, wherein steps a'2) to a'3) take place in an off board computer.

14. A hybrid automotive vehicle comprising:
   an internal combustion engine,
   an electric energy storage means,
   at least an electric machine configured to work as a generator or as a motor,
   a memory configured to store a target value,
   a computation means, and
   a display means,
   wherein the computation means is configured to:
      determine the target value of a parameter representative of fuel savings resulting from the use of the electric machine, wherein the parameter is a comparison of the energy needs of the vehicle for the trip corresponding to the energy savings resulting from the use of the storage means and the electric machine,
      wherein determining the target value comprises:
         computation of a first energy needs reference value of the vehicle to travel the trip when only the internal combustion engine is used;
         computation of an optimal second energy needs reference value of the vehicle to travel the trip when the internal combustion engine, the storage means and the electric machine are used; and
         computation of the target value of the parameter, on the basis of the first and second energy needs reference values;

determine an actual value of the parameter when the vehicle is running on the trip, wherein determining the actual value comprises:
- computation of a third energy value of the vehicle corresponding to an actual need of the internal combustion engine when the driver is driving the vehicle on the trip; and
- computation of the actual value of the parameter, on the basis of the first energy needs reference value and the third energy value; and compare the target value and the actual value; and wherein the display means is configured to:
- inform the user of a result of the comparison of the target value and the actual value at least at the end of the trip, wherein the result of the comparison of the target value and the actual value is a numerical value representing an influence of a driver's behavior in terms of fuel consumption.

15. The hybrid automotive vehicle according to claim 14, wherein the display means is further configured to display graphically the numerical value representing an influence of a driver's behavior in terms of fuel consumption.

\* \* \* \* \*